US012768756B2

(12) United States Patent
Shaffer et al.

(10) Patent No.: US 12,768,756 B2
(45) Date of Patent: Oct. 20, 2026

(54) # STAINING AGENT SOLUTIONS FOR USE IN FLUORESCENCE MICROSCOPY

(71) Applicant: SamanTree Medical (Switzerland) SA, Lausanne (CH)

(72) Inventors: Etienne Shaffer, Pailly (CH); Aurèle Timothée Horisberger, Crissier (CH); Frédéric Schmitt, Vulliens (CH); Bastien Rachet, Lausanne (CH)

(73) Assignee: SamanTree Medical (Switzerland) SA, Lausanne (CH)

( * ) Notice: Subject to any disclaimer, the term of this patent is extended or adjusted under 35 U.S.C. 154(b) by 960 days.

(21) Appl. No.: 16/806,555

(22) Filed: Mar. 2, 2020

(65) Prior Publication Data

US 2020/0284703 A1 Sep. 10, 2020

Related U.S. Application Data

(60) Provisional application No. 62/815,785, filed on Mar. 8, 2019.

(51) Int. Cl.
*C09K 11/06* (2006.01)
*G01N 1/30* (2006.01)

(52) U.S. Cl.
CPC ................ *G01N 1/30* (2013.01); *C09K 11/06* (2013.01); *C09K 2211/1441* (2013.01); *C09K 2211/1466* (2013.01); *G01N 2001/302* (2013.01)

(58) Field of Classification Search
CPC ............ C09K 11/06; C09K 2211/1441; C09K 2211/1466
See application file for complete search history.

(56) References Cited

U.S. PATENT DOCUMENTS

| | | | |
|---|---|---|---|
| 2,302,698 | A | 11/1942 | Kessel |
| 2,837,055 | A | 6/1958 | Whitehead |
| 4,181,745 | A | 1/1980 | Growe et al. |
| 4,572,850 | A | 2/1986 | Bailey |
| 4,798,162 | A | 1/1989 | Nelson |
| 5,334,509 | A | 8/1994 | Riordan |
| 6,790,636 | B1 | 9/2004 | Star et al. |
| 2003/0027777 | A1 | 2/2003 | Koff et al. |
| 2012/0053484 | A1 | 3/2012 | Parks |
| 2019/0129158 | A1 | 5/2019 | Shaffer et al. |
| 2019/0137752 | A1 | 5/2019 | Shaffer et al. |
| 2020/0309649 | A1 | 10/2020 | Shaffer et al. |

FOREIGN PATENT DOCUMENTS

| | | | |
|---|---|---|---|
| CN | 109078167 | A | 12/2018 |
| EP | 0881481 | A1 | 12/1998 |
| JP | 2006143643 | A * | 6/2006 |
| WO | WO-98/12534 | A1 | 3/1998 |
| WO | WO-03/031065 | A1 | 4/2003 |
| WO | WO-2014/186544 | A1 | 11/2014 |
| WO | WO-2019/086543 | A2 | 5/2019 |
| WO | WO-2019/086550 | A2 | 5/2019 |

OTHER PUBLICATIONS

Van der Veen et al. J. Dent. Res. 1996, 75, 588-593 (Year: 1996).*
Lelkes et al. J. Cell. Sci. 1986, 86, 57-67 (Year: 1986).*
European Pharmacopoeia 5.0, 2005, 4.1.3 Buffer Solutions, pp. 430-435 (Year: 2005).*
Hunter, C. Detection of leukocytes stained with acridine orange using unique spectral features acquired from an image-based spectrometer, Biomedical Engineering Undergraduate Honors Theses, 2017, pp. 1-16 (Year: 2017).*
Dobbs, J.L. et al., Feasibility of confocal fluorescence miscroscopy for real-time evaluation of neoplasia in fresh human breast tissue, J. Biomed. Opt., 18(10):106016 (2013).
International Search Report, PCT/EP2020/055941, mailed Jul. 3, 2020, 5 pages.
International Search Report, PCT/EP2020/055947, mailed Jul. 3, 2020, 5 pages.
Written Opinion, PCT/EP2020/055941, mailed Jul. 3, 2020, 6 pages.
Written Opinion, PCT/EP2020/055947, mailed Jul. 3, 2020, 6 pages.
BD, Safety Data Sheet acc. to OSHA HCS, Product Name: Acridine Orange Stain, 9 pages, (2016).
Bi Vitrum, Reagents for Tissue Fixation and Processing, 3 pages, (2019), [retrieved Apr. 17, 2019], <http://www.biovitrum.ru/en/products/test_category/reagents_for_tissue_fixation_and_processing/>.
Chang, T. P. et al., Imaging breast cancer morphology using probe-based confocal laser endomicroscopy: towards a real-time intraoperative imaging tool for cavity scanning, Breast Cancer Research Treatment, 53:299-310, (2015).

(Continued)

*Primary Examiner* — Matthew P Coughlin
(74) *Attorney, Agent, or Firm* — Choate, Hall & Stewart LLP; William R. Haulbrook; Michael D. Schmitt

(57) ABSTRACT

Disclosed herein are staining agent solutions for use in fluorescence microscopy. One example of fluorescence microscopy in which the staining agent solutions are useful is intraoperative confocal microscopy. Intraoperative confocal microscopy can be used, for example, to assess margins of resected cancerous tissue. Example staining agent solutions include acridine orange, where the pH of the solution is from 6 to 8, for example from 6.8 to 7.4. The solution may include a phosphate-buffered saline (PBS). The solution may be isotonic. The solution may comprise one or more of potassium dihydrogen phosphate, disodium hydrogen phosphate, and sodium chloride. In some embodiments, the staining agent solution does not comprise acetic acid (e.g., an acetate buffer). Staining agent solutions disclosed herein may reduce adverse impacts to tissue resulting from staining. Staining agent solutions disclosed herein may preserve normal appearance of tissue. Staining agent solutions disclosed herein may have negligible or reduced odor.

13 Claims, 6 Drawing Sheets

(56) References Cited

OTHER PUBLICATIONS

Jorgensen Labs, JorVet Dip Quick Stain, Introductory Kit, 11 pages, (2019) [retrieved Apr. 17, 2019] <http://www.jorvet.com/product/jorvet-dip-quick-stain-introductory-kit/>.
Merck KGaA, Safety Data Sheet, according to the (US) Hazard Communication Statndard (29 CFR 1910.1200, Product No. 115931, Product name: Arcidine orange zinc chloride double salt (C.I. 46005) for microsopy Certistain®, Version 1.2, 9 pages, (2014).
Preanalytix, PAXgene, Tissue FIX Contrainer (50 m;) Product Circular, 24 pages, (2013).
Preanalytix, PAXgene® Tissue Systems Sample Collection, 4 pages, (2013).
Preanalytix, Technical Note, PAXgene® Tissue System, Vacuum sealing of fixed and stailized tissue with a FoodSaver® Vacuum Sealer for dry and safe transport, 5 pages, (2013).
RAL Diagnostics, RAL Diff-Quick™ Fast acting variation of Romanowsky stain, 5 pages, (2019) [retrieved Apr. 17, 2019] <https://www.ral-diagnostics.fr/en/solutions/human-biology-haematology-cytology/ral-diff-quik/>.
Remel, Inc., Arcidine Orange, 2 pages, (2005).
Sigma-Aldrich, Safety Data Sheet, Product name: Acridine Orange hydrochloride solution, Product No. A8097, Version 5.1, 6 pages, (2014).
Bio-Optica Milano Spa, Acridine orange Information Sheet, 8 pages, (2017).
Bio-Optica, Acridine Orange solution, 1 page, (2013).
Bio-Optica, CE Declaration, 4 pages, (2018).
Adipogen Life Sciences, Physiological Saline [Sodium Chloride 0.9%] Endotoxin-free Sterile Solution, 2 pages, (2017), retrieved online at: https://adipogen.com/iax-900-003-physiological-saline-sodium-chloride-0-9-endotoxin-free-sterile-solution.html/.

* cited by examiner

200

STAINING AGENT SOLUTIONS FOR USE IN FLUORESCENCE MICROSCOPY

PRIORITY APPLICATION

This application claims the benefit of U.S. Provisional Patent Application No. 62/815,785, filed on Mar. 8, 2019, the disclosure of which is hereby incorporated by reference herein in its entirety.

TECHNICAL FIELD

This disclosure relates generally to staining agent solutions useful in fluorescence microscopy.

BACKGROUND

Many modalities of microscopy use fluorescence to generate images. One example of a microscopy modality that typically uses fluorescence is confocal microscopy. Many samples that are desirable to image do not naturally fluoresce. For example, most biological samples are not naturally fluorescent. In order to utilize fluorescence for imaging such biological samples, the samples need to be stained with a staining agent solution. The staining agent solution tags the sample with a fluorophore. Some staining agent solutions selectively stain certain cell or tissue types or certain portions of a cell, such as DNA. Acridine orange is an example of a fluorophore commonly used in staining agent solutions to fluorescently stain biological samples for fluorescence microscopy.

SUMMARY

It is presently found that commercially available staining agent solutions that include acridine orange are ill-suited for certain applications. Examples of such commercially available staining agent solutions include Remel ref. 40010 and Becton Dickinson (BD) ref. 212536. These staining agent solutions were developed specifically to stain microorganisms differentially from human cellular material. Moreover, typical staining agent solutions have several undesirable characteristics, such as noticeable smell, low pH, strong color, and toxic ingredients. There is a need for new staining agent solutions, particularly when maintaining tissue integrity is important and/or in applications where a sample will be exposed to a user during imaging, where characteristics, such as smell, color, low pH, and toxicity, can be particularly undesirable.

The present disclosure includes staining agent solutions for use in fluorescence microscopy, such as confocal fluorescence microscopy. In certain embodiments, the staining agent solutions mitigate or eliminate one or more undesirable characteristics such as noticeable smell, low pH, strong color, and toxic ingredients.

One example of an application of fluorescence microscopy that can utilize staining agent solutions disclosed herein is intraoperative confocal microscopy. Intraoperative confocal microscopy can be used to rapidly assess resected tissue samples. For example, a common procedure is to resect cancerous tissue from a patient. Once resected, it is important to check the resected tissue mass to determine that a sufficient margin of healthy tissue surrounds the removed cancerous tissue. If the resected tissue does not have an appropriate margin, reoperation may be required adding expense and risk to the patient. To perform an assessment of tissue margins, a resected tissue sample can be stained with a fluorescent staining agent solution and confocal microscopy can be used to image a surface layer of the tissue sample. It is important in such an application that the tissue is minimally disrupted in order to produce accurate images for assessment by the surgeon performing the resection and/or allow further postoperative assessment as part of the clinical workflow. Moreover, it is desirable for the appearance and smell to be undisrupted by the staining process in order to facilitate wide adoption of the process by surgical staff and not interfere with any qualitative assessment made of the tissue sample by visual inspection.

In one aspect, the present disclosure is directed to a staining agent solution for use in fluorescence microscopy, the staining agent solution comprising acridine orange, wherein the staining agent solution has a pH from 6 to 8 (e.g., from 6.5 to 7.5). In certain embodiments, the acridine orange is at a concentration from 0.05 g/L to 0.9 g/L [e.g., from 0.1 g/L to 0.4 g/L or from 0.1 g/L to 0.3 g/L (e.g., from 0.18 g/L to 0.22 g/L)] in the solution. In certain embodiments, the solution has a pH of from 6.8 to 7.4. In certain embodiments, the concentration of the acridine orange is from 0.18 g/L to 0.22 g/L.

In certain embodiments, the staining agent solution is a saline solution. In certain embodiments, the solution comprises a buffer. In certain embodiments, the buffer is a phosphate-buffered saline (PBS). In certain embodiments, the solution comprises a phosphate-buffered saline (PBS).

In certain embodiments, the acridine orange is acridine orange CAS 65-61-2. In certain embodiments, the acridine orange is acridine orange CAS 10127-02-3.

In certain embodiments, the solution is isotonic. In certain embodiments, the solution comprises sodium chloride. In certain embodiments, the solution has a sodium chloride concentration of from 6 g/L (e.g., 0.1 molar (M)) to 9 g/L (e.g., 1.5 M) (e.g., from 6.75 g/L to 7.25 g/L). In certain embodiments, the solution comprises potassium dihydrogen phosphate. In certain embodiments, the solution has a potassium dihydrogen phosphate concentration of less than 1 g/L (e.g., 7.3 millimolar (mM)). In certain embodiments, the solution has a potassium dihydrogen phosphate concentration of from 0.2 g/L (e.g., 1.5 mM) to 0.6 g/L (e.g., 4.4 mM) (e.g., from 0.35 g/L to 0.45 g/L). In certain embodiments, the solution comprising disodium hydrogen phosphate. In certain embodiments, the solution having a disodium hydrogen phosphate concentration of from 1 g/L (e.g., 7 mM) to 3 g/L (e.g., 21.1 mM) (e.g., from 1.25 g/L to 1.75 g/L).

In certain embodiments, the solution does not comprise acetic acid (e.g., an acetate buffer).

In another aspect, the present disclosure is directed to a method of sample imaging, the method comprising: staining a tissue sample (e.g., having a volume of from 0.25 $cm^3$ to 500 $cm^3$) with a fluorescent staining agent solution, wherein the staining agent solution comprises a fluorophore (e.g., acridine orange or proflavine) and has a pH from 6 to 8 (e.g., from 6.5 to 7.5); disposing the tissue sample on or over a transparent imaging window of an imaging system (e.g., wherein optics of the imaging system are protected from the tissue sample at least in part by the transparent imaging window), such that the tissue sample is exposed to a user (e.g., nurse or surgeon) during imaging (e.g., so that the tissue sample can be manipulated by the user; and imaging a surface of the tissue sample with the imaging system.

In certain embodiments, the tissue sample is exposed to the fluorescent staining agent solution for a period of no more than 1 minute (e.g., wherein the period is from 15 seconds to 30 seconds in length or from 1 second to 15 seconds). In certain embodiments, the imaging step comprises imaging the surface of the tissue sample in no more than 5 minutes (e.g., no more than 2 minutes or no more than 90 seconds).

In certain embodiments, the method comprises reorienting (e.g., rotating) the tissue sample; and imaging a second surface of the tissue sample with the imaging system.

In certain embodiments, the method is performed intraoperatively.

In certain embodiments, the imaging system is located in an operating room (e.g., in proximity to an operating table) [e.g., or in a room adjacent to an operating room (e.g., a sterilizable auxiliary room)] during the imaging. In certain embodiments, the staining of the tissue sample occurs in an operating room (e.g., in proximity to an operating table) [e.g., or in a room adjacent to an operating room (e.g., a sterilizable auxiliary room)].

In certain embodiments, the tissue sample is disposed on an exposed optical interface of a sample dish that is disposed between the tissue sample and the transparent imaging window.

In certain embodiments, the tissue sample is a resected tissue sample (e.g., a resected tissue sample comprising cancer).

In certain embodiments, the fluorophore is acridine orange and wherein the staining agent solution has an acridine orange concentration of from 0.05 g/L to 0.9 g/L [e.g., from 0.1 g/L to 0.4 g/L or from 0.1 g/L to 0.3 g/L (e.g., from 0.18 g/L to 0.22 g/L)]. In certain embodiments, the staining agent solution is a staining agent solution disclosed herein.

In another aspect, the present disclosure is directed to a staining agent solution for use in fluorescence microscopy, the staining agent solution comprising a fluorophore (e.g., proflavine, acriflavine and/or acridine orange) at a concentration from 0.05 g/L to 0.9 g/L (e.g., from 0.1 to 0.3 g/L), wherein the solution has a pH of from 6 to 8 (e.g., from 6.5 to 7.5).

BRIEF DESCRIPTION OF THE DRAWINGS

Drawings are presented herein for illustration purposes, not for limitation. The foregoing and other objects, aspects, features, and advantages of the disclosure will become more apparent and may be better understood by referring to the following description taken in conjunction with the accompanying drawings, in which.

DETAILED DESCRIPTION OF CERTAIN EMBODIMENTS

Figure 1A:
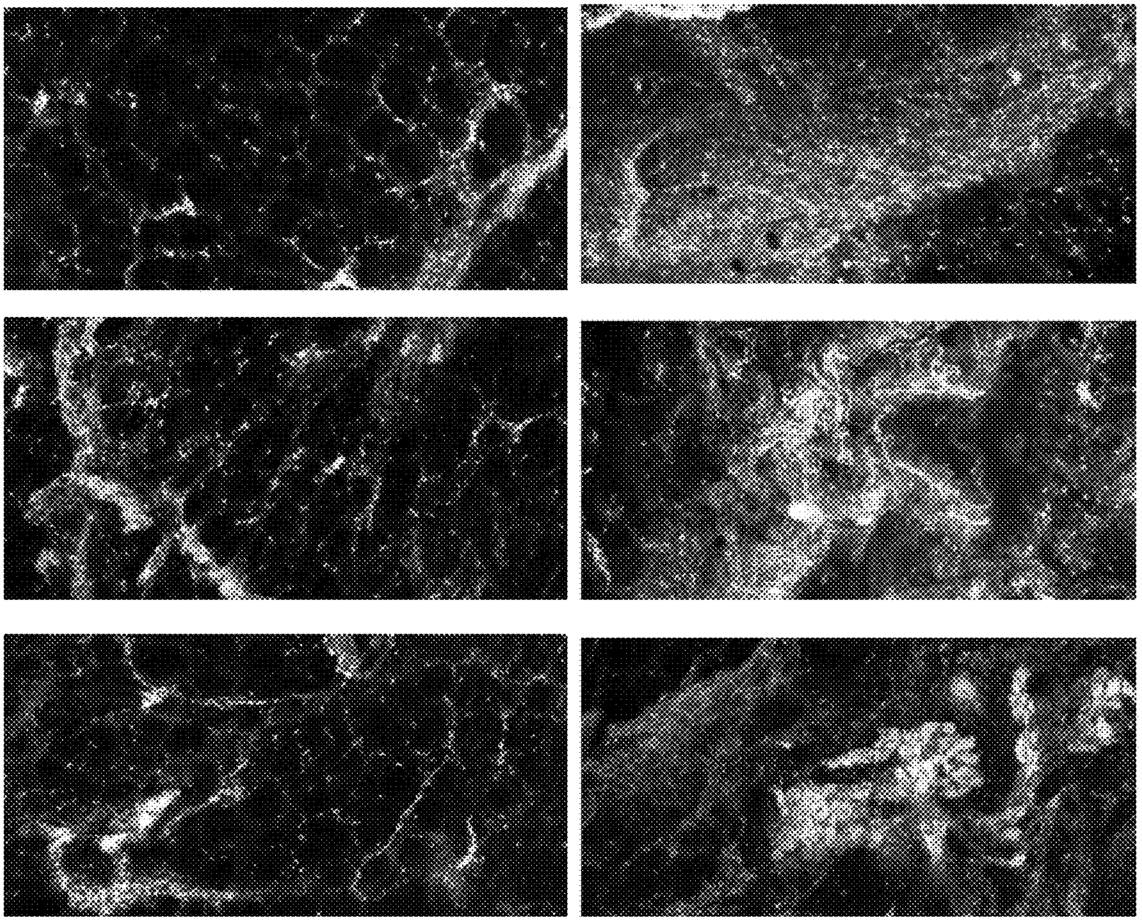
FIGS. 1A, 1B, 1C, and 1D show confocal images of different stained tissue samples resulting from comparative experimental tests.

Throughout the description, where compositions are described as having, including, or comprising specific components, or where processes and methods are described as having, including, or comprising specific steps, it is contemplated that, additionally, there are compositions that consist essentially of, or consist of, the recited components, and that there are processes and methods that consist essentially of, or consist of, the recited processing steps. It should be understood that the order of steps or order for performing certain action is immaterial so long as the invention remains operable. Moreover, two or more steps or actions may be conducted simultaneously. Headers are provided for the convenience of the reader and are not intended to be limiting with respect to the claimed subject matter. The presence of material in the Background section is not an admission that such material is prior art. Headers are provided for the convenience of the reader and are not intended to be limiting with respect to the claimed subject matter.

In this application, unless otherwise clear from context or otherwise explicitly stated, (i) the term "a" may be understood to mean "at least one"; (ii) the term "or" may be understood to mean "and/or"; (iii) the terms "comprising" and "including" may be understood to encompass itemized components or steps whether presented by themselves or together with one or more additional components or steps; (iv) the terms "about" and "approximately" may be understood to permit standard variation as would be understood by those of ordinary skill in the relevant art; and (v) where ranges are provided, endpoints are included. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Disclosed herein are staining agent solutions for use in fluorescence microscopy. In some embodiments, a staining agent solution is used to stain a sample, such as a biological sample, for confocal microscopy. Confocal microscopy may be performed intraoperatively and/or in an operating room, for example to assess margins of freshly resected tissue. A biological sample can be, but is not limited to, a tissue sample (e.g., a resected tissue sample) comprising cancer or cancerous cells. A staining agent solution may differentially stain different portions of a tissue sample. For example, a staining agent solution may stain cells different from non-cellular material or may selectively stain certain portions of a cell (e.g., DNA).

Staining Agent Solutions

In some embodiments, a staining agent solution comprises one or more fluorophores. An example of a fluorophore that may be included in a staining agent solution is acridine orange. In some embodiments, a staining agent solution comprises acridine orange (Chemical Abstracts Service registry number (CAS) 65-61-2). Acridine orange (CAS 65-61-2) has a chloride counterion. In some embodiments, a staining agent solution comprises acridine orange (CAS 10127-02-3). Acridine orange (CAS 10127-02-3) has a $ZnCl_2$ counterion. In some embodiments, a staining agent solution comprises both acridine orange (CAS 65-71-2) and acridine orange (CAS 10127-02-3). As used herein, "acridine orange" (without an explicitly stated CAS) is understood to refer to, in some embodiments, either of acridine orange (CAS 65-61-2) or acridine orange (CAS 10127-02-3) and, in some embodiments, a mixture of both acridine orange (CAS 65-61-2) and acridine orange (CAS 10127-02-3). Acridine orange may fluoresce at about 525 nm and may have an excitation maximum at about 500 nm (e.g., when bound to DNA). Acridine orange may fluoresce at about 650 nm and may have an excitation maximum at about 460 nm (e.g., when bound to RNA).

Proflavine (acridine-3,6-diamine) is a fluorophore that can be used to stain a sample. In some embodiments, a staining agent solution comprises proflavine with an hemisulfate counterion (CAS 1811-28-5). Proflavine in water [with pH of from 6 to 8 (e.g., from 6.5 to 7.5) (e.g., about 7)] may fluoresce at about 515 nm, and may have a peak absorption at about 460 nm. In some embodiments, a staining agent solution comprises both proflavine and acridine orange. In some embodiments, proflavine and acridine orange are used together in order to provide a staining agent solution capable of selectively staining portions (e.g., different portions) of a sample.

Acriflavine (3,6-diamino-10-methylacridin-10-ium chloride) is a fluorophore that can be used to stain a sample. Acriflavine in water [with pH of from 6 to 8 (e.g., from 6.5 to 7.5) (e.g., about 7)] may fluoresce at about 515 nm, and may have an excitation maximum at about 415 nm. In some embodiments, a staining agent solution comprises acriflavine. For example, a staining agent solution may comprise acriflavine (CAS 8048-52-0), which has a chloride counterion. In some embodiments, a fluorophore in a staining agent solution is acriflavine. In some embodiments, a staining agent solution comprises both acriflavine and acridine orange. In some embodiments, acriflavine and acridine orange are used together in order to provide a staining agent solution capable of selectively staining portions (e.g., different portions) of a sample.

In some embodiments, a staining agent solution has a pH from 6 to 8 (e.g., from 6.5 to 7.5) and comprises one or more fluorophores (e.g., in addition to acridine orange) (e.g., at a concentration of 0.05 g/L to 0.9 g/L), wherein the one or more fluorophores are selected from the group consisting of fluorescein, eosin, rhodamine, and green fluorescent protein.

Fluorophore concentration in a staining agent solution must be sufficiently high to stain a sample, or portion thereof, but high fluorophore concentration can introduce toxicity that may degrade a tissue sample as well as may exceed the solubility limit of the fluorophore in the solution. For example, in the case of acridine orange, commercially available staining agent solutions typically have an acridine orange concentration of 0.1 g/L in the solutions. In some embodiments, a staining agent solution disclosed herein comprises a fluorophore (e.g., acridine orange or proflavine) having a concentration of from 0.05 g/L to 0.9 g/L in the solution [e.g., from 0.1 g/L to 0.4 g/L or from 0.1 g/L to 0.3 g/L (e.g., from 0.18 g/L to 0.22 g/L) or from 0.1 g/L to 0.2 g/L]. Without wishing to be bound by any particular theory, a concentration of acridine orange below about 0.2 g/L has no adverse impact on postoperative assessment of tissue samples. In some embodiments, a staining agent solution disclosed herein comprises a fluorophore (e.g., acridine orange or proflavine) having a concentration of from 0.05 g/L to 0.9 g/L (e.g., from 0.18 g/L to 0.22 g/L).

Commercially available acridine orange solutions are fairly acidic, commonly having a pH of below 6, for example around 3.5-4. Such a low pH results from use of acetic acid in an acetate-buffer solution, with its natural pH of about 4.75, and, in some case, addition of hydrochloric acid (HCl) to further lower the pH. Such a pH may be acceptable for certain applications, such as determining whether one or more microorganisms are present in a sample, but are undesirable when maintaining tissue integrity is of high importance. For example, it is desirable to maintain the integrity of tissue resected during surgery during staining both for any fluorescence imaging that is performed intraoperatively (e.g., without fixing the sample) and for any postoperative histological assessment (such as a paraffin section analysis). In some embodiments, a solution may be made by diluting acridine orange in pure water without buffer, but also results in relatively low pH of around 5.5. In some embodiments, a staining agent solution comprises a fluorophore, such as acridine orange, where the solution has a pH of from 6 to 8 (e.g., from 6.5 to 7.5 or from 6.8 to 7.4). In this way, the staining agent solution has a pH more closely resembling a physiological pH, thereby reducing the likelihood of adversely impacting (e.g., damaging) a tissue sample when stained. In some embodiments, a staining agent solution does not comprise acetic acid (e.g., an acetate buffer).

Solubility of a fluorophore at neutral pH (e.g., from 6 to 8) can be achieved by using an appropriate solvent. In some embodiments, a fluorophore, such as acridine orange, is in a solution. In some embodiments, the solution comprises a buffer. A buffer can stabilize pH, thereby improving long-term stability of the staining agent solution. In some embodiments, the buffer is a phosphate-buffered saline (PBS). In some embodiments, the buffer is isotonic. In some embodiments, the solution comprises saline. In some embodiments, the solution comprises a phosphate-buffered saline (PBS).

A solution in which a fluorophore is distributed may comprise water. Water alone may be insufficient to mitigate adverse impacts to a tissue sample. Osmotic shock may occur, thereby impacting a tissue sample (e.g., damaging fat cells), if water alone is used as the solvent for a fluorophore. Therefore, in some embodiments, the solution in which a fluorophore is distributed is isotonic. A PBS may be used in the solution to provide approximate isotonicity. Therefore, a PBS can serve a dual function of providing a physiologically compatible pH (e.g., from 6 to 8) and mitigating damage caused by osmolarity or ion concentration differences.

One or more salts may be included in a solution, for example to provide desired counterions and/or tonicity. For example, a solution may include one or more of sodium chloride, potassium phosphate, and sodium phosphate. In some embodiments, a fluorophore is in a solution comprising sodium chloride. In some embodiments, the sodium chloride concentration is from 6 g/L to 9 g/L. In some embodiments, a fluorophore is in a solution comprising potassium dihydrogen phosphate. In some embodiments, the potassium dihydrogen phosphate concentration is less than 1 g/L (e.g., from 0.25 g/L to 0.5 g/L). In some embodiments, a fluorophore is in a solution comprising disodium hydrogen phosphate. In some embodiments, the disodium hydrogen phosphate concentration is from 1 g/L to 3 g/L.

The commonly used acetate buffer solution has another undesirable characteristic for a staining agent solution: smell. Acetic acid gives off a relatively strong and unpleasant smell. While the smell may be mild enough to tolerate in a laboratory setting, the smell can be off-putting and even potentially dangerous in an operating room or patient examination room setting. For example, a strong chemical smell may cause a surgeon to be less likely to use a staining agent solution or even to forgo intraoperative fluorescence imaging. Moreover, a strong chemical smell can mask or obfuscate other, potentially more subtle odors, which may endanger a patient being treated near where a staining agent solution is being used. For example, in an operating room, a strong chemical odor may mask or obfuscate a smell emanating from a patient indicative of an adverse change in the patient. For example, a new smell from a patient may indicate that a fluid barrier has been breached during surgery and may be masked or obfuscated by a staining agent solution with a strong smell. Therefore, reducing or eliminating strong smells from a staining agent solution not only makes the staining agent solution more pleasant to work with, but can actually improve health outcomes for patients (e.g., by leading to faster detection of a problem during surgery). A solution without acetic acid or other chemicals having strong odors is therefore preferable. A PBS can be used instead of typically-used buffer (e.g., acetate buffer) to reduce or eliminate strong smell.

By mimicking physiological conditions, such as osmolarity, ion concentration, pH or a combination thereof for example, and/or reducing toxicity, the visual appearance of a tissue sample may be better maintained during staining. Toxicity of a staining agent solution may cause cellular degradation or disruption during staining that changes the appearance of a tissue sample. Non-physiological conditions of a staining agent solution may also cause cellular degradation or disruption during staining that changes the appearance of a tissue sample. The visual appearance of a tissue sample can be important for a number of reasons, including for example qualitative assessment of tissue quality and/or composition. For example, during intraoperative tissue resection, a surgeon may qualitatively assess the tissue that has been resected to make a preliminary determination of margins and/or health status of the patient. Staining agent solutions disclosed herein more closely mimic physiological conditions and/or have reduced toxicity, as compared to commercially available staining agent solutions, such that the initial visual appearance of biological samples (e.g., freshly resected tissue) is better maintained during staining.

Examples of Staining Agent Solutions

A staining agent solution may include acridine orange dissolved in a PBS solution at a concentration of from 0.1 g/L to 0.3 g/L, where the solution included from 6 to 8 g/L of sodium chloride, from 0.3 to 0.5 g/L of potassium dihydrogen phosphate, and from 1 to 2 g/L of disodium hydrogen phosphate. In one example, a staining agent solution having the following characteristics was made and tested: 0.2 g/L of acridine orange (CAS 65-61-2) in a PBS comprising 7 g/L of sodium chloride, 0.4 g/L potassium dihydrogen phosphate, and 1.5 g/L of disodium hydrogen phosphate. The resulting solution had a pH of about 7.2, was isotonic, and did not exhibit a noticeable chemical smell. The solution was stable over a relevant time period (e.g., at least an hour). The fluorescence stability, as determined by intensity over 30 minutes after staining, was comparable or exceeded a control solution of Remel ref 40010. In some embodiments, for example, a staining agent solution comprises 0.2 g/L of acridine orange (CAS 65-61-2) in a PBS comprising 7 g/L of sodium chloride, 0.4 g/L potassium dihydrogen phosphate, and 1.5 g/L of disodium hydrogen phosphate. Staining agent solutions comprising acridine orange at a concentration of 0.4 g/L and 0.8 g/L and having a pH from 6 to 8 have also been produced, tested, and found to sufficiently stain samples to produce useable images.

Figure 1B:
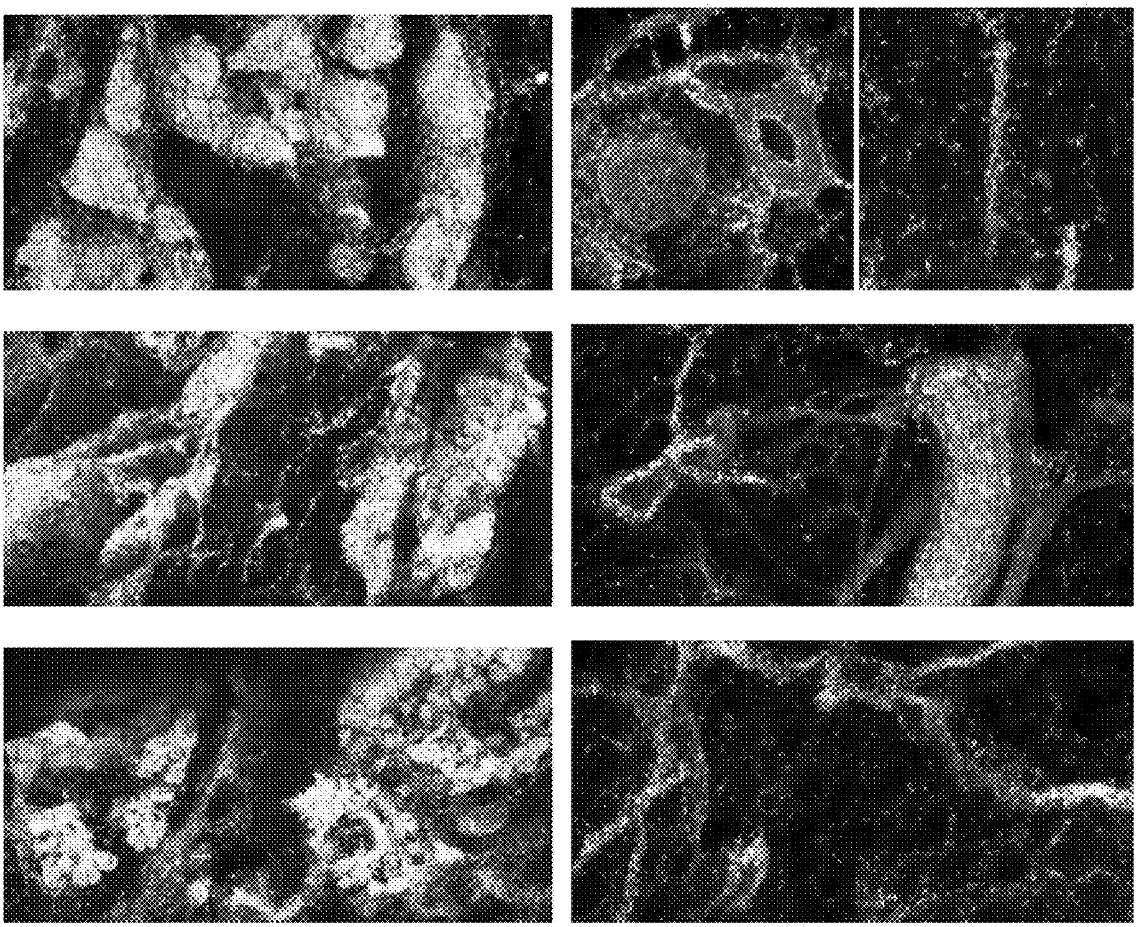

In a first comparative example, a staining agent solution that includes 0.16 g/L acridine orange and 9 g/L NaCl in water was made. In a second comparative example, a staining agent solution that includes 0.16 g/L acridine orange in a PBS comprising 7 g/L NaCl and 0.4 g/L potassium dihydrogen phosphate, and 1.5 g/L of disodium hydrogen phosphate was made. The staining agent solutions of the first comparative example and the second comparative example were tested and compared to a reference staining agent solution of Remel ref. 40010. In a representative comparative test, images were acquired from samples stained with the reference staining agent solution, a staining agent solution according to the first example, and a staining agent solution according to the second example. Staining of a pork breast tissue sample (approximately 8×8×20 mm in size) was performed for 30 seconds, samples were simultaneously rinsed in a common NaCl solution (e.g. 9 g/L) for approximately 6 seconds, and imaged within 30 minutes of staining. FIGS. 1A and 1B show confocal images of the stained samples from the comparative test. In FIG. 1A, the images in the top row show stained fat cells and the images in the bottom row show stained connective tissue. The left image in the bottom row of FIG. 1A also shows stained glands in addition to the stained connective tissue. In FIG. 1B, the images in the top row show stained glands and the images in the bottom row show stained vessels. The left images of the top and bottom rows of both FIG. 1A and FIG. 1B correspond to the reference solution. The center images of the top and bottom rows of both FIG. 1A and FIG. 1B correspond to the solution according to the first comparative example. The right images of the top and bottom rows of both FIG. 1A and FIG. 1B correspond to the solution according to the second comparative example. Fluorescence intensity for the sample stained with the reference solution decreased about 7% over the testing period. Fluorescence intensity for the sample stained with the solution according to the first example decayed only about 2% over the testing period. Fluorescence intensity for the sample stained with the solution according to the second example decayed only about 4% over the testing period.

Figure 1D:
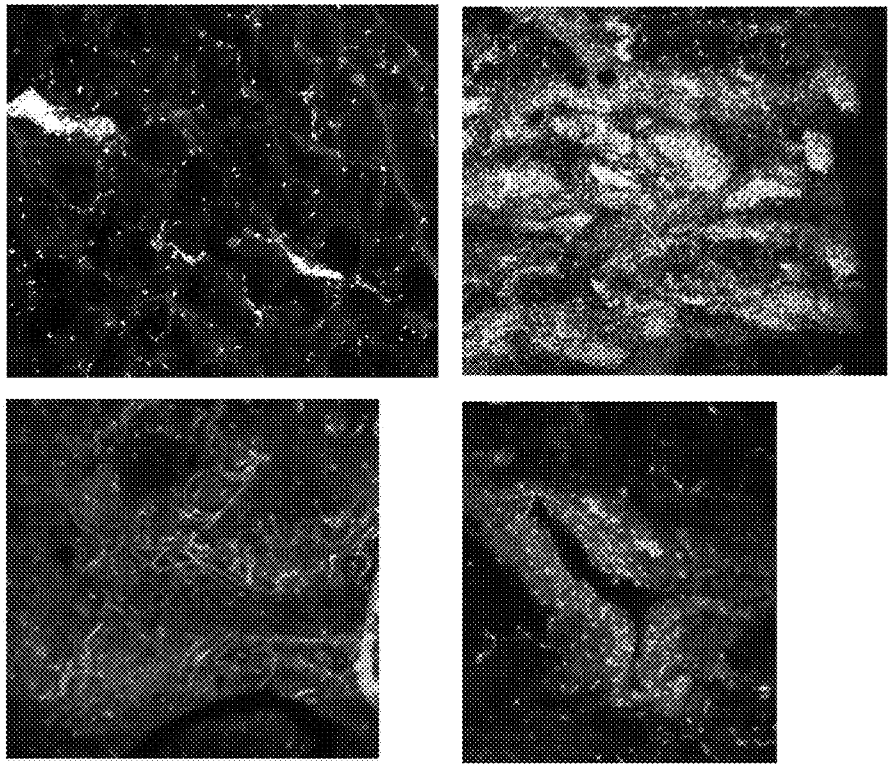
Figure 1C:
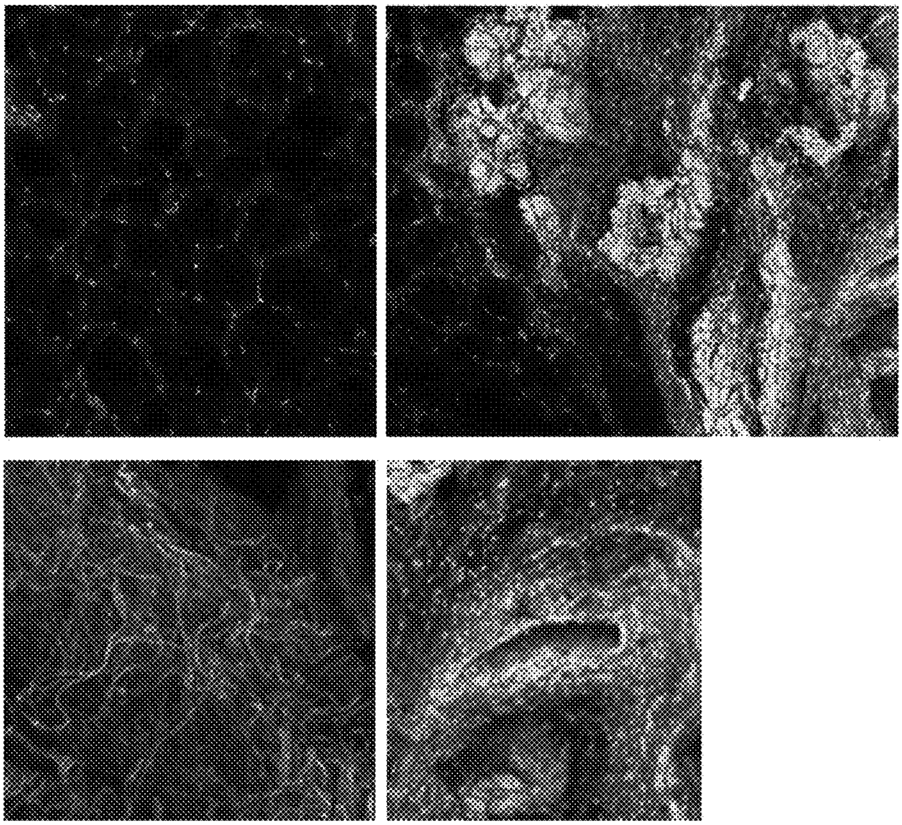

In a third example, a staining agent solution that includes 0.2 g/L acridine orange (CAS 10127-02-3) in PBS comprising 7 g/L NaCl, 0.4 g/L potassium dihydrogen phosphate and 1.5 g/L of disodium hydrogen phosphate was made. The staining agent solutions of the third example were tested and compared to a reference staining agent solution of Remel ref. 40010. In a representative comparative test, images were acquired from samples stained with the reference staining agent solution and a staining agent solution according to the third example. Staining of a pork breast tissue sample (approximately 8×8×20 mm in size) was performed for 30 seconds, samples were simultaneously rinsed in a NaCl solution for approximately 6 seconds, and imaged within 30 minutes of staining. FIG. 1C and FIG. 1D show confocal images of the stained samples from the comparative test. FIG. 1C shows images of tissue specimen stained with a reference staining agent solution of Remel ref 40010. FIG. 1D shows images of tissue specimen stained with a staining agent solution according to the third example. In FIG. 1C and FIG. 1D, the upper left image shows stained connective tissue, the lower left image shows stained vessels, the upper right image shows stained fatty tissue and the lower right image shows stained glandular tissue. The staining agent solution of the third example provided correct and repeatable visualization of relevant morphological structures at least as well as the reference solution (by qualitative assessment). Furthermore, the staining agent solution of the third example provides reasonably stable signal over time (having $\leq$20% variation in fluorescence signal over 20 minutes). In some embodiments, a staining agent solution corresponding to the third example is preferred for having desirable characteristics of stability, low smell, and biocompatibility (e.g., reduced risk of osmotic shock occurring).

Methods of Use of Staining Agent Solutions

Staining agent solutions disclosed herein are useful, for example, for fluorescence microscopy where the sample is exposed to a user (e.g., nurse, doctor, or surgeon) during imaging with an imaging system. Examples of imaging systems useful in combination with a staining agent solution disclosed herein include those described in International Patent Application Nos. PCT/EP18/79894, filed Oct. 31, 2018, and PCT/EP18/79885, filed Oct. 31, 2018, the disclosure of each of which is hereby incorporated by reference in its entirety.

Figure 2A:
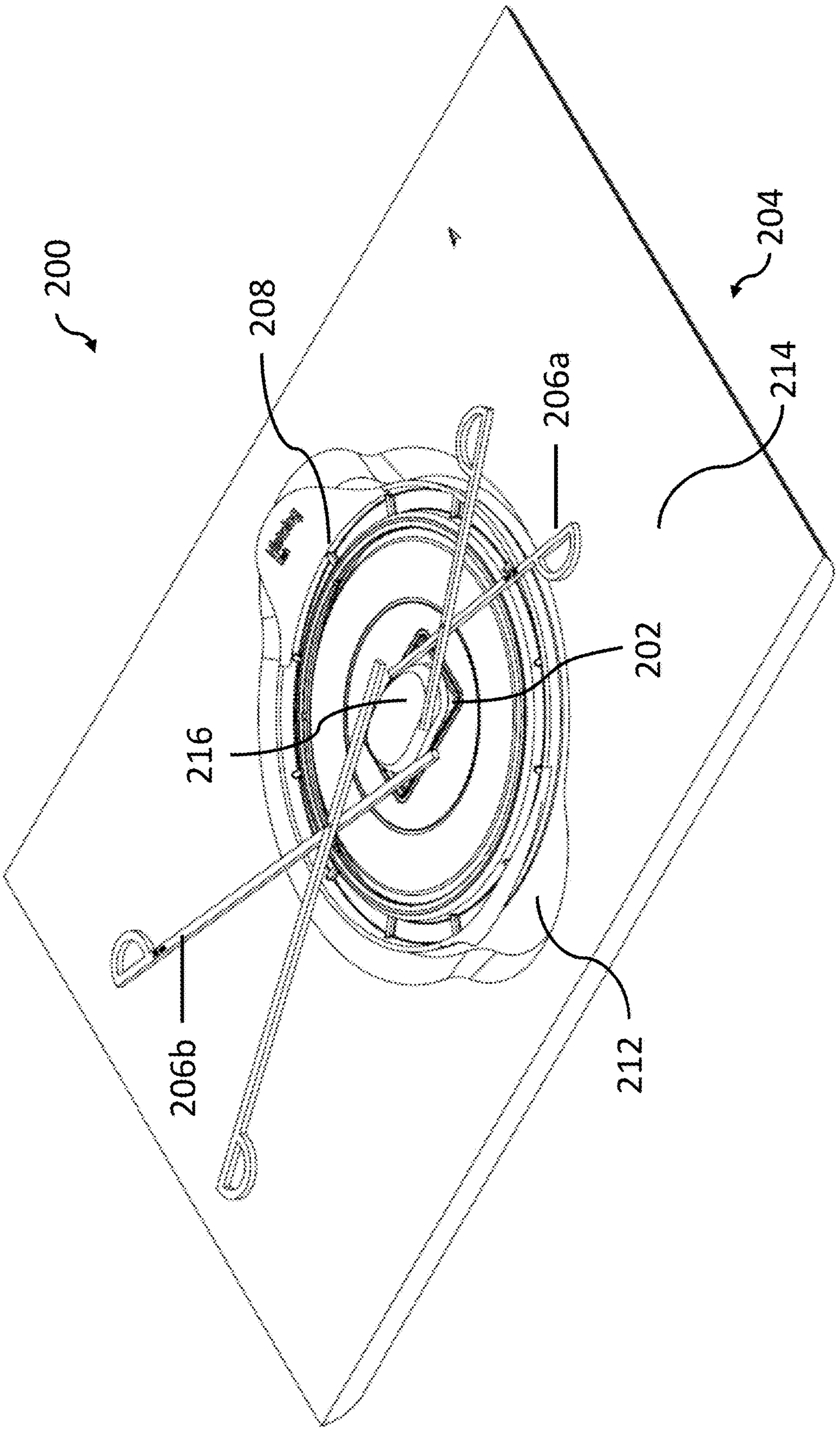
FIG. 2A shows a fluorescently stained biological sample disposed on an imaging system, according to illustrative embodiments of the disclosure.

FIG. 2A shows a close up partial view of an example of an imaging system 200 with sample dish 208 disposed thereon. Tissue sample 216 (e.g., a freshly resected tissue sample) is disposed on sample dish 208. Illustrative imaging system 200 has an exposed working area (e.g., working surface and sample) that is available to a user during imaging (i.e., the exposed working area is not covered). Tissue sample 216 can be disposed on sample dish 208 without the need for an additional sample holder. Sample dish 208 comprises an optical interface that is exposed to a user of imaging system 200 during imaging such that the user can use forceps 206*a-b* (or his or her hand) to position and/or orient tissue sample 216. Moreover, forceps 206*a-b* can remain in a desired position while imaging the sample due to the exposed interface. Transparent imaging window 202 can be seen through the optical interface of sample dish 208. Sample dish 208 is disposed between tissue sample 216 and transparent imaging window 202. Transparent imaging window 202 allows an illumination beam and back-emitted light to pass therethrough in order to generate a fluorescence image (e.g., is at least 50% transparent to one or more wavelengths of an illumination beam and back-emitted light from one or more fluorophores in a staining agent solution).

Housing 204 comprises an imaging window support base 212 (attached to an imaging window support that holds transparent imaging window 202) and upper working surface 214. Imaging window support base 212 is recessed from upper working sample 214 such that when sample dish 208 is mounted onto imaging system 200, the sample dish is positioned at or slightly below upper working surface 214. Such an arrangement allows easy lateral access to a sample from all sides of a sample, even during imaging. Moreover, since the imaging window support base 212 is recessed from upper working surface 214 and the exposed surface of sample dish 108 is near (e.g., at or slightly below) the same plane as upper working surface 214, tools (e.g., forceps) can easily be used and left in place during imaging (e.g., to hold a sample in a particular position). Housing 204 and transparent imaging window 202 act to isolate optics of imaging system 200 (not shown) from a tissue sample (e.g., to prevent contamination and/or damage of the optics).

A user can visually monitor and interact with tissue sample 216 during imaging with imaging system 200 because it is exposed. Moreover, imaging can be performed quite rapidly because tissue sample 216 can be easily reoriented between images. For example, a first surface of tissue sample 216 may face transparent imaging window 202 initially, such that a first image obtained by imaging system 200 corresponds to the first surface. Then, tissue sample 216 can be quickly reoriented (without needing to temporarily disassemble or open a sample holder) to image a second surface of tissue sample 216. For example, a tissue sample may be rotated by some number of degrees (e.g., 90 degrees) or flipped over. In some examples, multiple (e.g., several or many) different region of interests of a tissue sample may be imaged (e.g., with different orientations, such as regions on opposite sides of the tissue sample) and the tissue sample thus needs to be repositioned at least once (e.g., several or many times) in order to image all of the regions of interest.

Figure 2B:
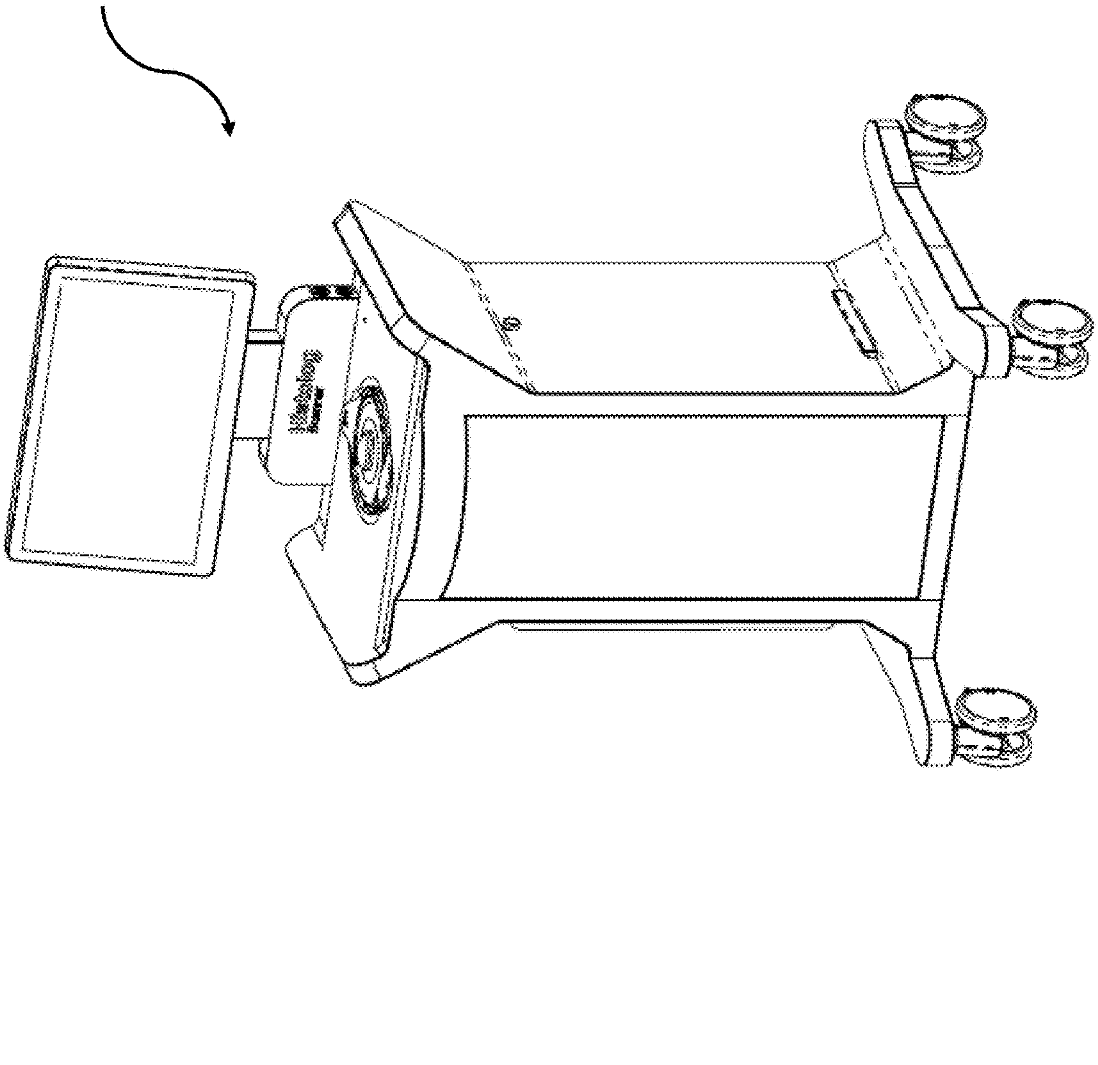
FIG. 2B shows a full view of the imaging system of FIG. 2A, according to illustrative embodiments of the disclosure.

FIG. 2B shows a full view of imaging system 200. Imaging system 200 has lockable wheels that allow it to be easily repositioned. Imaging system 200 can be located in an operating room and can be used intraoperatively to perform assessments of freshly resected tissue.

Staining agent solutions disclosed herein may quickly sufficiently stain a sample [e.g., a surface layer of the sample to a certain penetration depth (e.g., in a range from 0.1 mm to 1 mm, for example from 0.4 mm to 0.6 mm)] to allow fluorescence microscopy (e.g., confocal microscopy) to be performed. For example, in some embodiments, a staining agent solution can sufficiently stain a sample in a period of time that is no more than 1 minute (e.g., that is from 20 seconds to 40 seconds in length or that is 1 to 20 seconds in length). In some embodiments, a staining agent solution can sufficiently stain a sample in a period of time from 1 second to 15 seconds. In some embodiments, a staining agent solution can sufficiently stain a sample in a period of time from 15 seconds to 45 seconds. In some embodiments, a staining agent solution can sufficiently stain a sample in a period of time from 5 seconds to 45 seconds. In some embodiments, samples to be imaged are relatively large (e.g., having dimensions up to 10 cm×10 cm×10 cm). For example, typical breast cancer tissue samples (lumps) can be as large as 8 cm in at least one dimension and thus have an area to image (full surface) up to 400 $cm^2$ (e.g., approximately equivalent to an 8 cm×8 cm×8 cm volume). In some embodiments, a tissue sample has a volume of from 0.25 $cm^3$ to 500 $cm^3$. In some embodiments, an imaging system can image up to 18 $cm^2$ (e.g., up to 10 $cm^2$, up to 12 $cm^2$, or up to 15 $cm^2$) in a period of time of no more than 3 minutes (e.g., no more than 2 minutes, no more than 90 seconds, or no more than one minute) for example by using a large array of micro optical elements to perform a large area parallel scan. Staining agent solutions disclosed herein are capable of sufficiently staining a tissue sample to produce high quality fluorescence images within the aforementioned short time period. In some embodiments, no more than 50 images (e.g., no more than 40 images or no more than 30 images) and thus less than 60 minutes (e.g., less than 40 minutes or less than 30 minutes) are needed to image the entire surface of a large sample. Less time (and less images) is (are) needed to image smaller samples. In certain embodiments, a full sample surface (e.g., of a resected tissue sample comprising cancer) is imaged during an intraoperative assessment.

In some embodiments, staining and/or imaging of a stained tissue sample with an imaging system occurs intraoperatively, thereby allowing assessments of images to be made during the surgery. In some embodiments, staining and/or imaging of a stained tissue sample with an imaging system occurs in an operating room or a room adjacent to an operating room (e.g., a sterilizable auxiliary room). For example, an imaging system may be located in an operating room (e.g., in proximity to an operating table). By locating an imaging system in an operating room and also staining samples in the operating room, time between fresh resection of tissue and image acquisition can be reduced. Adoption of such a procedure may be aided by a staining agent solution that lacks undesirable characteristics, for example strong smell.

A tissue sample may be stained, for example, by immersing or dipping the tissue sample in a beaker filled with a staining agent solution or by coating the tissue sample with the staining agent solution. In some embodiments, a tissue sample is rinsed (e.g., with or in a salt solution) after staining and prior to imaging.

Figure 3:
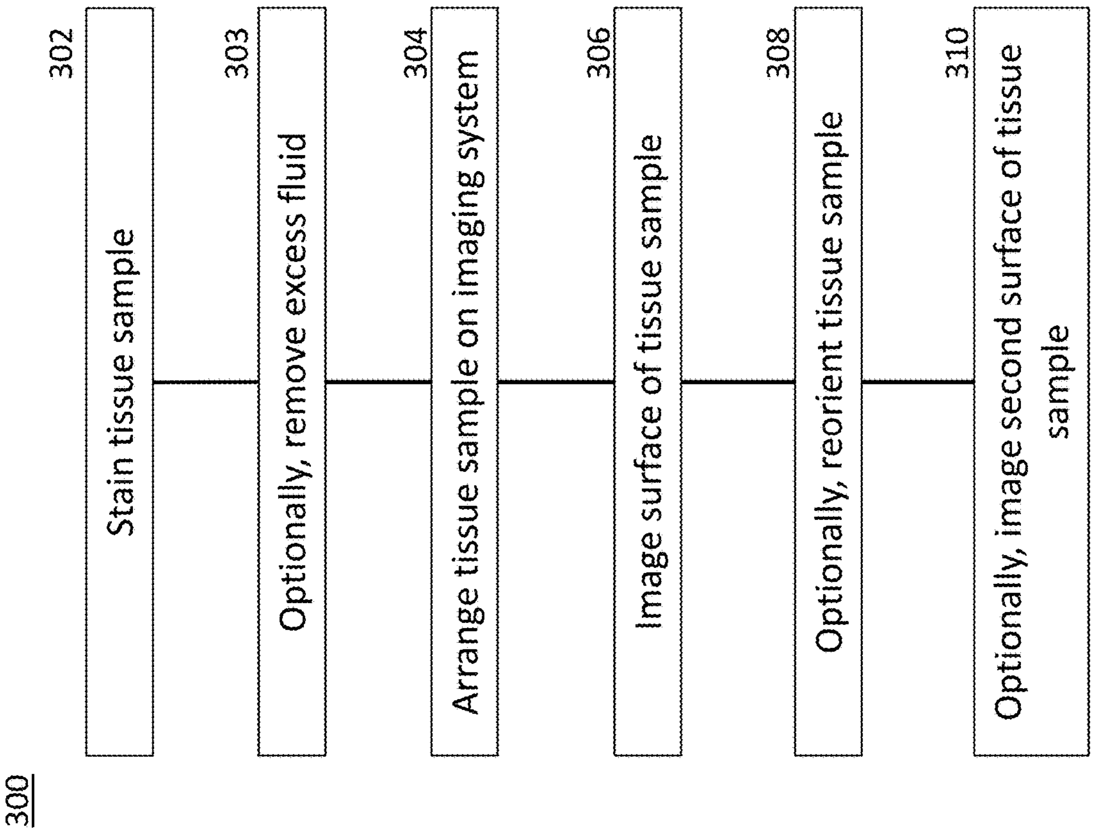
FIG. 3 is a flow diagram of a method for intraoperative imaging, according to illustrative embodiments of the disclosure.

FIG. 3 is a flow diagram illustrating an exemplary method 300 of imaging a tissue sample using a staining agent solution disclosed herein. In step 302, the tissue sample is stained. The staining agent solution used to stain the tissue sample may be, for example, a staining agent solution comprising acridine orange at a concentration of from 0.1 g/L to 0.3 g/L in a solution having a pH of from 6 to 8. The tissue sample may be stained, for example, by immersing or dipping the tissue sample in a beaker filled with a staining agent solution or by coating the tissue sample with the staining agent solution. The staining agent solution may be applied to the tissue sample for a period of time of no more than 1 minute (e.g., a period of from 15 seconds to 30 seconds). In step 303, excess fluid (e.g., stain or blood) may be optionally removed after staining, for example by rinsing with saline solution and/or by using a wipe or towel. In step 304, the tissue sample is arranged on an imaging system for imaging. The imaging system may be, for example, illustrative imaging system 200 discussed with reference to FIGS. 2A and 2B. In some embodiments, the tissue sample is exposed (e.g., accessible) to a user after being arranged for imaging (e.g., and throughout imaging). In step 306, a surface of the tissue sample is imaged (e.g., in no more than three minutes). In optional step 308, the tissue sample is reoriented to image a second surface of the sample (e.g., in order to perform a full surface mapping). In optional step 310, the second surface of the sample is imaged. Images obtained during the method can be of higher quality because the staining agent solution does not disrupt or degrade the tissue sample.

Certain embodiments of the present disclosure were described above. It is, however, expressly noted that the present disclosure is not limited to those embodiments, but rather the intention is that additions and modifications to what was expressly described in the present disclosure are also included within the scope of the disclosure. Moreover, it is to be understood that the features of the various embodiments described in the present disclosure were not mutually exclusive and can exist in various combinations and permutations, even if such combinations or permutations were not made express, without departing from the spirit and scope of the disclosure. Having described certain implementations of staining agent solutions and methods of their use, it will now become apparent to one of skill in the art that other implementations incorporating the concepts of the disclosure may be used. Therefore, the disclosure should not be limited to certain implementations, but rather should be limited only by the spirit and scope of the following claims.

What is claimed is:

1. A staining agent saline solution for use in intraoperative fluorescence microscopy of freshly resected tissue samples, the staining agent solution comprising acridine orange at a concentration from 0.16 g/L to 0.22 g/L and a buffer, wherein the staining agent solution has a pH from 6.8 to 7.4 and the buffer is a phosphate-buffered saline (PBS).

2. The staining agent solution of claim 1, wherein the solution is isotonic.

3. The staining agent solution of claim 1, wherein the acridine orange is acridine orange CAS 65-61-2.

4. The staining agent solution of claim 1, wherein the acridine orange is acridine orange CAS 10127-02-03.

5. The staining agent solution of claim 1, the solution comprising sodium chloride.

6. The staining agent solution of claim 5, the solution having a sodium chloride concentration of from 6 g/L to 9 g/L.

7. The staining agent solution of claim 1, the solution comprising potassium dihydrogen phosphate.

8. The staining agent solution of claim 7, wherein the solution has a potassium dihydrogen phosphate concentration of less than 1 g/L.

9. The staining agent solution of claim 1, wherein the solution does not comprise acetic acid.

10. The staining agent solution of claim 1, wherein the acridine orange is at a concentration from 0.18 g/L to 0.22 g/L.

11. The staining agent solution of claim 8, wherein the solution has a potassium dihydrogen phosphate concentration of from 0.2 g/L to 0.6 g/L.

12. The staining agent solution of claim 1, wherein the solution comprises disodium hydrogen phosphate.

13. The staining agent solution of claim 12, the solution having a disodium hydrogen phosphate concentration of from 1 g/L to 3 g/L.

* * * * *